3,085,941
ACRYLAMIDE DERIVATIVES FOR THE SUPPRESSION OF TUMORS

Andrew S. Tomcufcik, Tappan, N.Y., Stuart D. Willson, Park Ridge, N.J., and Adolph W. Vogel, Pearl River, N.Y., assignors to American Cyanamid Company, New York, N.Y., a corporation of Maine
No Drawing. Filed May 9, 1960, Ser. No. 27,521
14 Claims. (Cl. 167—65)

This invention relates to novel compositions of matter for the treatment of malignant growths in mammals.

In recent years there has been noted a greater incidence of tumor growths than heretofore. This has been ascribed to various reasons including longer life span, the pressures of modern life, food additives, tabacco, etc. A need exists, therefore, for compositions which are destructive to tumorous cells while at the same time having comparatively little or no effect on normal cells. In the past many compositions have been tried including, for example, the nitrogen mustards and other chemicals. These compositions have not been very satisfactory because of undesirable and sometimes severe side effects.

We have now discovered that compounds represented by the following general formula, when the active ingredient of the novel compositions of matter of the present invention, are useful in causing the remission of tumors:

$$CH_2=CH-\overset{O}{\overset{\|}{C}}-NH-(CH_2)_n-NH-\overset{O}{\overset{\|}{C}}-\underset{R}{C}=CH_2$$

in which R is hydrogen or lower alkyl and $n$ is a whole number less than 8. The most effective compounds in causing the remission of tumors are those according to the above general formula wherein $n$ is 1 or 2 and R is as previously defined.

The compounds of the present invention may be prepared in a variety of ways. For example, where $n$ is 1 and R is hydrogen, the interaction of 2 moles of acrylamide with 1 mole of formaldehyde in the presence of a strong acid gives the N,N'-methylene-bis-acrylamide. Where $n$ is 1 and R is lower alkyl, then the interaction of 1 mole of acrylamide, 1 mole of a 2-alkyl substituted acrylamide and 1 mole of formaldehyde in strong acid gives rise to the desired N-(2-alkylpropeneamidomethyl)-acrylamide. It is also possible to carry out this reaction step-wise. That is, 1 mole of acrylamide may be caused to react with 1 mole of formaldehyde in the presence of an alkali to produce N-methylolacrylamide which in turn is converted to the desired N-(2-alkylpropeneamido-methyl)acrylamide by reaction with 1 mole of a 2-alkyl substituted acrylamide in the presence of strong acid. Alternatively, 1 mole of a 2-alkyl substituted acrylamide may be caused to react with 1 mole of formaldehyde in the presence of an alkali to produce an N-methylol-2-alkylpropeneamide which in turn is converted to the desired N-(2-alkylpropeneamidomethyl)acrylamide by reaction with 1 mole of acrylamide in the presence of strong acid. Generally, the desired product may be recovered from the reaction mixture by concentration or by dilution with water.

Where $n$ is a whole number greater than 1 and R is hydrogen, the desired N,N'-alkylene-bis-acrylamides may be readily prepared by the interaction of 2 moles of acryloyl chloride with 2 moles of an α,ω-alkylene diamine in an inert solvent; the second mole of diamine acting to bind the liberated HCl. Where $n$ is a whole number greater than 1 and R is lower alkyl, the desired N-acryloyl-N'-(2-alkylacryloyl)alkylene diamine may be readily prepared by the interaction of 1 mole of acryloyl chloride, 1 mole of a 2-alkyl substituted acryloyl chloride and 1 mole of an α,ω-alkylene diamine in an inert solvent. It is also possible to carry out this reaction step-wise. That is, 1 mole of acryloyl chloride may be caused to react with 1 mole of an α,ω-alkylene diamine in an inert solvent to produce N-acryloylalkylene diamine which in turn is converted to the desired N-acryloyl-N'-(2-alkylacryloyl)-alkylene diamine by reaction with 1 mole of a 2-alkyl substituted acryloyl chloride in an inert solvent. Alternatively, 1 mole of a 2-alkyl substituted acryloyl chloride may be caused to react with 1 mole of an α,ω-alkylene diamine in an inert solvent to produce an N-(2-alkylacryloyl)alkylene diamine which in turn is converted to an N-acryloyl-N'(2-alkylacryloyl)alkylene diamine by reaction with 1 mole of acryloyl chloride in an inert solvent. Generally, the desired product may be recovered from the reaction mixture by concentration or by dilution with water.

The compounds of the present invention were tested against the tumors Sarcoma 180, lymphosarcoma $6C_3HED$ and $C_3H$ mammary adenocarcinoma 72j. Tumors from donor mice were minced and the particles transplanted, using a trocar, and insereted subcutaneously into the axillary region of a $C_3H$ inbred strain of mice. When the tumors had grown to a palpable sixe (5–14 days) depending on the particular tumor, the test mice were grouped according to tumor size and treatment was started. An exception was the lymphosarcoma $6C_3HED$ in which treatment was started 2 to 3 days after implant before tumors were palpable. Treatment was by daily intraperitoneal injection for 6 days. Tumor harvest was on the seventh day following the first treatment. The tumors were weighed after excision and the following "activity ratio" was determined.

Activity ratio
$$= \frac{\text{Average weight of tumors from control mice}}{\text{Average weight of tumors from treated mice}}$$

A compound was judged active if its "activity ratio" exceeded 3.50 in the case of Sarcoma 180, 6.39 in the case of lymphosarcoma $6C_3HED$, and 3.72 in the case of adenocarcinoma 72j.

The following table summarizes the testing results for the active compounds of the present invention.

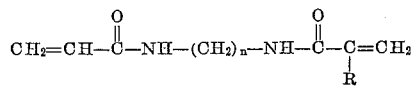

| R | $n$ | Anti-Tumor Activity | | |
|---|---|---|---|---|
|   |   | Sa. 180 | 72j | $6C_3HED$ |
| H | 1 | A | A | I |
| $CH_3$ | 1 | I | A | I |
| H | 2 | I | A | A |
| H | 3 | I | A | I |
| H | 6 | I | A | I |
| H | 7 | I | A | I |

A=active.
I=inactive.

The dosage of the compounds of the present invention differs according to the compound, and the progression of the disease. The oral dose per day may vary from 5 to 500 mg. per kg. of body weight. A divided dose may vary from 50 mg. to 5.0 g. and the frequency of administration may vary widely.

The activity of the compounds of the present invention against animal tumors presages a usefulness in the clinical remission of lymphomas and leukemias for periods of time that will vary with different individuals. However, the effectiveness of the compounds of the present invention in causing the remission of tumors in human subjects has not yet been demonstrated.

The compounds of the present invention may be orally administered in any of the usual dosage unit forms of pharmaceutical preparations. These may take the form of tablets, capsules, pills, powders or any other desirable form in the therapeutic quantities set forth above. The dosage form may be for a single daily therapeutic dose or in smaller units for multiple doses or in larger units for division into single doses. It is understood that in addition to the therapeutic compound there may be present excipients, binders, fillers, and other therapeutically inert ingredients necessary in the formulation of pharmaceutical preparations.

The compounds of the present invention may also be administered parenterally by dissolving or suspending the compound in a parenterally suitable vehicle such as, for example, propylene glycol or polyethylene glycol, or by dissolving or suspending the compound in an aqueous solution of such vehicle.

The following examples show the preparation and formulation of the therapeutic compounds of the present invention.

EXAMPLE 1

N,N'-Methylene-Bis-Acrylamide

This compound was prepared according to the method set forth in U.S. Patent No. 2,475,846 to Lundberg. The compound was tested for its anti-tumor activity as shown hereinbefore.

EXAMPLE 2

N-(Acrylamidomethyl)Methacrylamide

A mixture of 4.04 g. of N-methylolacrylamide, 3.50 g. of methacrylamide, and 0.4 ml. of concentrated hydrochloric acid was refluxed for one hour in 70 ml. of ethylene dichloride. Some polymer was removed by filtration, the filtrate was cooled and yielded 4.25 g. (63% yield) of N-(acrylamidomethyl)methacrylamide, M.P. 160–162° C. dec.

EXAMPLE 3

N,N'-Ethylene-Bis-Acrylamide

This compound was prepared according to the method set forth in German Patent No. 743,466. The compound was tested for its anti-tumor activity as shown hereinbefore.

EXAMPLE 4

N,N'-Trimethylene-Bis-Acrylamide

A solution of 15 g. of trimethylene diamine in 200 ml. of ethylene chloride was stirred at 10° C. while 18 g. of acryloyl chloride was added during 30 minutes. The mixture was stirred at 20° C. for several hours and then stored at 5° C. overnight. The solids were then removed by filtration. The filtrate was concentrated in vacuo at 30 to 40° C., and the residue obtained was added to the precipitated solids. Extraction of the combined solids by hot chloroform and concentration of the extract gave 14 g. (90% crude yield) of N,N'-trimethylene-bis-acrylamide. Recrystallization from chloroform-benzene gave the pure product, M.P. 116°–117.5°.

EXAMPLE 5

N,N'-Hexamethylene-Bis-Acrylamide

This compound was prepared according to the method of Example 4 by employing hexamethylene diamine in lieu of trimethylene diamine. The compound was tested for its anti-tumor activity as shown hereinbefore.

EXAMPLE 6

N,N'-Heptamethylene-Bis-Acrylamide

A solution of 10.2 g. of 1,7-heptanediamine and 15.6 g. of triethylamine in 250 ml. of ethylene dichloride was treated at 10° C. with 15.0 g. of acryloyl chloride. The mixture was stirred 2 hours at 25° C., diluted with 100 ml. of 1:1 chloroform-benzene and stored overnight at 5° C. The triethylamine hydrochloride was filtered off and washed with chloroform-benzene. The filtrate was put on a column of 170 g. of alumina and eluted with chloroform-benzene-methanol. From the eluate was recovered 6.8 g. (38%) of N,N'-heptamethylene-bis-acrylamide, M.P. 107–117° C. Recrystallization from ethylene dichloride gave the pure product, M.P. 119–120° C.

EXAMPLE 7

A mixture of 30 parts of N-(acrylamidomethyl)-methacrylamide, 15 parts of starch, and 1 part of magnesium stearate was thoroughly blended and then screened through at 60 mesh screen. The resulting powder was tableted in an automatic tableting machine whereby suitable 500 mg. scored white tablets were obtained.

What is claimed is:

1. A therapeutic composition for oral administration useful for the remission of tumors in dosage unit form comprising from 0.25 g. to 50 g. of a compound having the general formula:

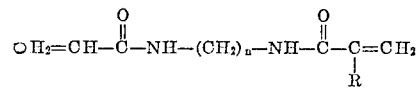

wherein R is a member of the group consisting of hydrogen and lower alkyl radicals, and $n$ is a whole number less than 8, and a solid pharmaceutical carrier.

2. A therapeutic composition for oral administration useful for the remission of tumors in dosage unit form comprising from 0.25 g. to 50 g. of N,N'-methylene-bis-acrylamide and a solid pharmaceutical carrier.

3. A therapeutic composition for oral administration useful for the remission of tumors in dosage unit form comprising from 0.25 g. to 50 g. of N-(acrylamidomethyl)-methacrylamide and a solid pharmaceutical carrier.

4. A therapeutic composition for oral administration useful for the remission of tumors in dosage unit form comprising from 0.25 g. to 50 g. of N,N'-ethylene-bis-acrylamide and a solid pharmaceutical carrier.

5. A therapeutic composition for oral administration useful for the remission of tumors in dosage unit form comprising from 0.25 g. to 50 g. of N,N'-trimethylene-bis-acrylamide and a solid pharmaceutical carrier.

6. A therapeutic composition for oral administration useful for the remission of tumors in dosage unit form comprising from 0.25 g. to 50 g. of N,N'-hexamethylene-bis-acrylamide and a solid pharmaceutical carrier.

7. A therapeutic composition for oral administration useful for the remission of tumors in dosage unit form comprising from 0.25 g. to 50 g. of N,N'-heptamethylene-bis-acrylamide and a solid pharmaceutical carrier.

8. A method for causing the remission of tumors in mammals which comprises administering in dosage unit form from 5 mg. to 500 mg. per kg. of body weight per day of a compound of the formula:

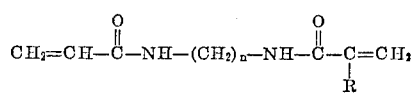

wherein R is a member of the group consisting of hydrogen and lower alkyl radicals, and $n$ is a whole number less than 8.

9. A method for causing the remission of tumors in mammals which comprises administering in dosage unit form from 5 mg. to 500 mg. per kg. of body weight per day of N,N'-methylene-bis-acrylamide.

10. A method for causing the remission of tumors in mammals which comprises administering in dosage unit form from 5 mg. to 500 mg. per kg. of body weight per day of N-(acrylamidomethyl)-methacrylamide.

11. A method for causing the remission of tumors in mammals which comprises administering in dosage unit form from 5 mg. to 500 mg. per kg. of body weight per day of N,N'-ethylene-bis-acrylamide.

12. A method for causing the remission of tumors in mammals which comprises administering in dosage unit form from 5 mg. to 500 mg. per kg. of body weight per day of N,N'-trimethylene-bis-acrylamide.

13. A method for causing the remission of tumors in mammals which comprises administering in dosage unit form from 5 mg. to 500 mg. per kg. of body weight per day of N,N'-hexamethylene-bis-acrylamide.

14. A method for causing the remission of tumors in mammals which comprises administering in dosage unit form from 5 mg. to 500 mg. per kg. of body weight per day of N,N'-heptamethylene-bis-acrylamide.

References Cited in the file of this patent

UNITED STATES PATENTS 2,475,846   Lundberg _____ July 12, 1949

FOREIGN PATENTS 743,466   Germany _____ Nov. 4, 1952

OTHER REFERENCES

American Jurisprudence—Proof of Facts, annotated vol. 3, © 1959, The Lawyers Co-operative Publishing Co., Rochester, N.Y., "Cancer," pp. 130–131.

Pfizer Spectrum, "Screening of Anti-Cancer Agents," vol. 7, No. 3, March 1959, pp. 62–63.